United States Patent [19]

Dahlquist

[11] 4,403,427
[45] Sep. 13, 1983

[54] TREE PLANTER

[76] Inventor: Arthur Dahlquist, 1404 E. Crystal Lake Rd., Burnsville, Minn. 55337

[21] Appl. No.: 384,021

[22] Filed: Jun. 1, 1982

[51] Int. Cl.$^3$ ............................................. A01G 23/04
[52] U.S. Cl. ....................................... 37/2 R; 111/2
[58] Field of Search ................. 37/2 R; 296/3; 111/2; 414/687

[56] References Cited

U.S. PATENT DOCUMENTS

| | | | |
|---|---|---|---|
| 3,713,234 | 1/1973 | Grover et al. | 37/2 R |
| 3,936,960 | 2/1976 | Clegg | 37/2 R |
| 4,226,033 | 10/1980 | Dehaan | 37/2 R |
| 4,271,879 | 6/1981 | Shivers et al. | 37/2 R |
| 4,286,398 | 9/1981 | Lemond et al. | 37/2 R |
| 4,351,253 | 9/1982 | Dahlquist | 37/2 R X |

*Primary Examiner*—E. H. Eickholt
*Attorney, Agent, or Firm*—Hugh D. Jaeger

[57] ABSTRACT

Tree planter for mounting on a truck chassis, the tree planter including a four-spade digger reciprocally mounted on an end of an extendable boom, the boom movable at the other end on a self-aligning bushing, the bushing secured in a hoist frame. The boom includes three attached hydraulic cylinders for boom up/down hoist motion, boom roll/twist motion and boom side/side motion, and a fourth internal boom extension hydraulic cylinder for telescoping the boom between a retracted and extended position. The four hydraulic cylinders position the digger with all degrees of radial and axial freedom. A fifth hydraulic cylinder controls tilt of the digger with respect to the boom. The four-spade digger includes six hydraulic cylinders, one hydraulic cylinder for actuating each of four spades for up-and-down action in each spade tower, and two hydraulic cylinders to open and close rear gates around a tree when either digging up or planting a tree from either the ground or about a truncated continuous cone-shaped container of a tree transportating trailer. The tree planter is hydraulically operated in a parallelogram action providing articulation for facilitating work operations in close quarters at nurseries, tree farms and points of delivery. The tree planter includes an embodiment for a vibrating spade assembly using a pulsating electric valve or the like for opening of the hydraulic valve in addition to varying the frequency of vibration of each spade. A second embodiment of a large-sized spade for utilization in close, confining areas provides that the spade is raised in a substantially parallel plane with minimal arcuate movement.

15 Claims, 11 Drawing Figures

TREE PLANTER

CROSS REFERENCES TO CO-PENDING APPLICATIONS

This application relates to a co-pending patent application entitled "Tree Planter," Ser. No. 145,671, filed May 1, 1980.

BACKGROUND OF THE INVENTION

1. Field of the Invention

The present invention pertains to an agricultural implentation for excavating and planting shrubs, trees or other agricultural commodities, and, more importantly, pertains to an articulated tree planter with a telescoping boom for transplanting trees and the like including the tree and accompanying roots with soil adhering thereto. The tree planter includes a four-spade digger including a telescoping boom having all axial and radial degrees of freedom.

2. Description of Prior Art

Prior art tree planters have failed to have any versatility such as freedom of movement of the boom, especially supporting a digger having the four spades and reciprocal gates which exhibits all degrees of movement.

The prior art truck-mounted booms have failed to have any versatility in that the boom only tilted around one vertical pivot point at the end of a truck chassis and with extremely limited height as determined by the tail end chassis height off the ground.

The prior art digger including the spades could be pivoted about an axis on the chassis tail end but failed to provide any axial side movement, any radial roll sideway movement, or any other angular movement of the digger for positioning the digger including a root ball of agricultural roots such as tree roots with encompassing dirt attached thereto at a predetermined spot except by continuously jerking the truck to desired location.

To properly position the digger into a pre-dug hole, whether the pre-dug hole was dug by hand, with another device, or with the tree digger itself, it was necessary for the operator of the truck with the digger to maneuver the truck so as to exactly position the digger holding the root ball directly above the hole. Then, and only then, could the digger including the spades as a unit be dropped down into the hole thereby releasing the tree from the captivity of the spades of the digger once each spade was retracted.

Another prior art problem of tree diggers was that it was first necessary to dig a hole for the tree or agricultural product before the truck arrived with the product within the confines of the spades of the digger. Usually this entailed the truck with the tree digger first going out to the location, digging the hole and positioning the dirt from the hole wherever it was convenient such as on another part of the property. In the alternative, after the hole was dug, the truck would carry the dirt to the nursery or wherever the tree was picked up; then the operator of the truck would excavate the tree or agricultural product from a nursery location; then finally return to the original dug hole and plant the tree or agricultural product into the hole.

A further particular problem with the prior art tree diggers was that it was only possible to dig and plant one tree at a time, requiring at least one trip if not more commonly two trips to the site of planting of the tree or agricultural product. As the case at hand would always have it, the nursery or point of picking up of the tree would always be inconveniently located at a considerable distance from the point of planting the tree, thereby requiring a considerable expenditure not only of time but also of precious fuel to traverse between the two points. This also resulted in least and diminished profits derived due to the lengthy expenditure of time traversing between two points.

The prior art tree diggers have also failed to lift high enough to load trees or agricultural products onto a trailer in addition to lacking all degrees of freedom. The boom supporting the digger lacked versatility, did not extend or telescope, and lacked any degrees of freedom on the tree planter thereby preventing use of the tree transporting trailer.

The present invention overcomes the deficiencies of the prior art by providing a tree planter-digger for trees and agricultural products having all degrees of axial and radial freedom, high lift, and a telescoping, extendable boom. The tree planter is particularly useful for planting of mature trees. The present invention also includes a spade vibrator for vibrating each spade during the digging process. The present invention further includes a hydraulic linkage for raising of each spade blade in a substantially parallel plane with minimal arcuate movement for working in close quarters.

SUMMARY OF THE INVENTION

The general purpose of the present invention is to provide a tree planter including a truck having a tree digger on an extendable boom on the frame of the truck, the boom having all degrees of axial and radial movement with freedom about the boom. The general purpose of the present invention is also to provide a vibrating blade assembly for excavating and planting of trees or the like in hard ground. The general purpose of the present invention is also to include a spade tower arrangement utilizing dual hydraulic cylinders for raising each spade in a substantially identical plane with minimal arcuate movement of the spade for working in close and confining quarters.

While trees have been used as an illustration of one of the intended purposes of the present invention of the articulated tree planter with a telescoping boom, by way of example and for purposes of illustration only, "tree" is intended to be a generic term and not to be construed as limiting of the present invention. Tree in the generic sense can include any agricultural product such as trees like maple and oak, shrubs, bushes, evergreens, specific grasses or clumps of soil containing zoysia grass, etc.

According to one embodiment of the present invention, there is provided a tree planter for placement on a vehicular chassis including a frame, an engine mounted on the frame, at least two axles of wheels axially mounted on the frame, a transmission connected between one of the axles and the engine, a hydraulic take-off power system for providing hydraulic pressure connected to the engine, a hoist frame structure affixed to the vehicle frame and supporting a main pivot point, a boom including a telescopically extendable inner and outer boom assembly affixed at the main pivot point through a self-aligning bushing, a main boom hoist cylinder connected between the mid portion of the outer boom and the lower portion of the hoist frame through self-aligning bushings, a side-swing cylinder connected between a side pivot point of the outer boom and the hoist frame through self-aligning bushings, a yaw twist cylinder connected through a bar linkage between the main pivot point and the hoist frame through self-aligning bushings, an inner boom supporting a nose for a digger, inner boom slidable on a plurality of rollers supported at one end of the inner boom, at an outer end of the outer boom, and riding on a track between opposing rollers affixed to the interior of the outer boom, and a hydraulic cylinder connected between the outer ends of the inner boom and the outer boom for telescopically extending the inner and outer booms, a nose pivot cylinder connected between the outer end of the inner boom and a tree digger pivoted on the end of the nose, the nose pivot cylinder mounted between self-aligning bushings, the tree digger including an octagonal frame and including four hydraulically actuated spade towers supporting spades actuated by hydraulic cylinders, and two gate pivots at six o'clock and twelve o'clock, the gates actuated by gate hydraulic cylinders between the nine o'clock position and twelve and six o'clock position, the gate hydraulic cylinders mounted through self-aligning bushings for opening and closing the gates about a mature tree, and a slave cylinder connected between the hoist frame and a point slightly ahead of the main pivot point on the lower portion of the outer boom whereby the main boom hoist elevator cylinder, the yaw twist cylinder and the swing cylinder provide for all degrees of axial and radial freedom of movement of the tree digger, the hydraulic cylinder connected between the outer ends of the outer boom and inner boom provide for telescopic and extending action of the boom carrying the tree digger assembly, the slave cylinder acting in conjunction with the nose pivot cylinder provides for parallelogram action providing articulation of the tree digger while moving the boom forward and aft, and an octagonal tree digger assembly providing for working in restricted areas and about mature trees.

Another embodiment of the present invention is to provide a pulsator for a spade cylinder providing for the cutting through of heavy roots or in hard ground. This eliminates a lot of the pressure required which would ordinarily be applied and provides for easy and fast digging of trees. The pulsator circuit includes an electric valve actuated by a switch, either electromechanical or electrical, which also includes a variable potentiometer or the like for varying the pulsating speed. The pulsator can operate all four cylinders or any combination thereof. The pulsator also eliminates the need for softening the ground with water which is time consuming and also eliminates the need for carrying of water on the tree digger truck which had been a standard prior art practice. The vibrator-pulsator, either or the combination, provides for varying the vibrating-pulsating time of the spades and eases the pressure which would otherwise have to be absorbed by the boom, digger frame, and related components affixed thereto.

An additional embodiment of the present invention is to provide a two-cylinder linkage for raising of a large spade in minimal area on a substantially like plane with minimal arcuate movement raising the blade from a planting position to an elevated position on each spade tower of the plurality of spade towers. This type of movement of sliding channel members by two hydraulic cylinders elevates the spade fixed to the spade tower assembly with very minimal arcuate movement.

A significant aspect and feature of the present invention is a tree planter which allows an operator to move and plant mature trees. The tree planter is particularly useful with a tree trailer having continuous truncated cones for transporting mature trees.

Another significant aspect and feature of the present invention is a tree planter mounted on a vehicular chassis which is versatile with all degrees of movement, including all degrees of axial and radial freedom. A boom roll-twist hydraulic cylinder and a boom side swing hydraulic cylinder connect to a hoist frame through self-aligning bushings which can also be described as spherical bushings, self-aligning or spherical bearings. A boom up-down hydraulic cylinder controls forward and aft movements of the digger spade along with a digger spade tilt hydraulic cylinder.

A further significant aspect and feature of the present invention is a tree planter including electric or mechanical structure for vibrating of any one or all of the spades in the spade frame. The vibrating of each spade provides for the excavation or planting of trees or the like in hard ground. The vibrating motion also eliminates the stress on the hydraulic system components as well as other like considerations requiring less pressure in forcing the spades through the ground when the spades are vibrated through the ground.

A further significant aspect and feature of the present invention is a spade tower utilizing two hydraulic cylinders to raise each spade about the spade tower with sliding channel members to a maximum height in least minimal area with least minimal arcuate movement to the spade. This is particularly important when working within close confines or with particularly large trees.

Having thus described embodiments of the present invention, it is the principal object hereof to provide a tree planter for planting mature trees.

An object of the present invention is a mature tree planter which reduces labor and fuel costs by providing for the transporting of mature trees, especially in conjunction with handling with a tree trailer having continuous truncated cones. This extends the range of operation while increasing profits at the same time, in addition to extending the selling season in that large trees can be dug, transported and transplanted with minimum mortality.

Another object of the present invention is a tree planter which provides for enlarging of the market by making it possible for the nurseryman to sell mature trees. This provides a competitive edge to the commercial nursery. Greater sales volume provides greater flexibility on delivery schedules while extending the range of travel in addition to same-day planting of healthier trees. This provides service to the landscape and nursery industry.

An additional object of the present invention is to provide a tree planter with dual arcuated hydraulic cylinders affixed to each spade tower, providing for substantially planar movement of each spade with least minimal arcuate movement. This provides for working within close confines and quarters.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference numerals designate like parts throughout the figures thereof and wherein.

DESCRIPTION OF PREFERRED EMBODIMENTS

Figure 1:
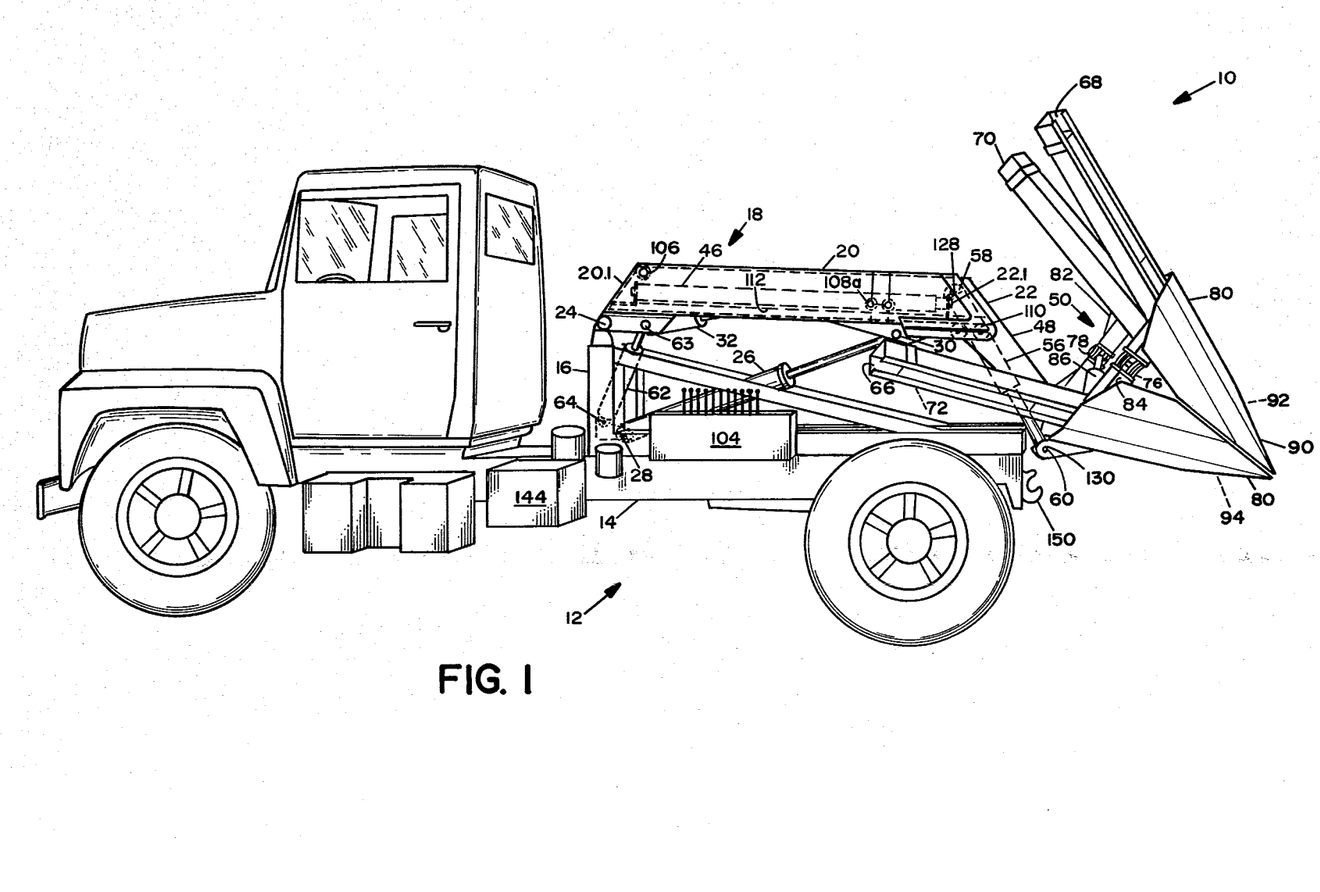
FIG. 1 illustrates a left side view of a tree planter on a truck.
Figure 2:
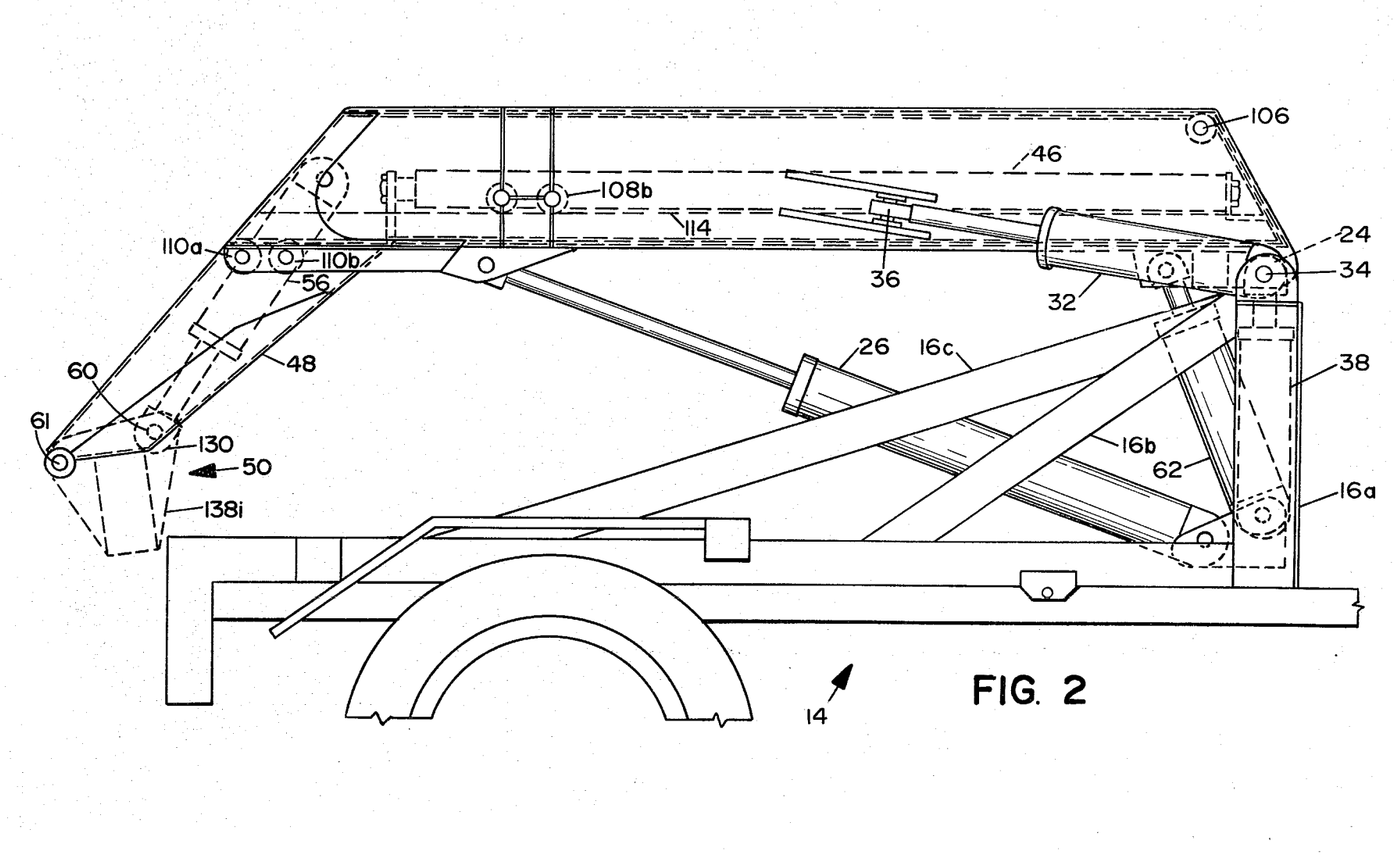
FIG. 2 illustrates a right side view of the tree planter.

FIG. 1, which illustrates a side view of the present invention, shows a tree planter 10 as now described in detail with reference to FIG. 1 and FIGS. 2-5. The tree planter 10 includes a vehicular assembly 12 including common vehicle components of wheels, engine, transmission and a hydraulic power takeoff system, and a longitudinal chassis frame 14 which supports the vehicular components. Hoist frame 16 secures and bolts to the chassis 14, and supports a boom assembly 18 including an outer boom 20 secured at one end 20.1 to first self-aligning bushing 24 and supporting an inner extendable telescoping boom 22 therein. Boom hoist up-down hydraulic cylinder 26 pivotally connects between a self-aligning bushing 28 at a bottom of the hoist frame to a mid-pivot point self-aligning bushing 30 on the boom 20. Machine side-side motion hydraulic cylinder 32 connects between a pivot point self-aligning bushing 34 on the hoist frame 18 and a self-aligning bushing 36 on the boom 20 as illustrated in FIG. 2. A boom roll-twist hydraulic cylinder 38 illustrated in FIG. 5 connects between a self-aligning bushing 40 secured to the hoist frame 16 and through a self-aligning bushing 42 and a bar linkage 44 through the self-aligning bushing 24. A boom extension telescoping hydraulic cylinder 46 connects between the outer boom 20 point 20.1 and the inner boom 22 point 22.1. A boom hook 48 connects to the end 22.1 of inner boom 22 and supports four-spade digger assembly 50 at opposing pivot points 52 and 54 of FIG. 6. A tilt hydraulic cylinder 56 connects between pivot points 58 and 60. A hydraulic cylinder 62 connects between self-aligning bushings 63 and 64 and provides for parallelogram action as a slave cylinder.

Roller 106 mounts at the top of the inside boom 22 for riding against the upper interior of the outer boom 20. An opposing right-angle track 112 and 114 is positioned on opposing sides of the mid portion of the inner boom 22 for riding on wheel assemblies 108a and 108b affixed to the inner sides of the outer boom 20. Wheel assemblies 110 support the inner boom during rolling. This is also illustrated in detail in FIGS. 2, 4 and 5.

Figure 6:
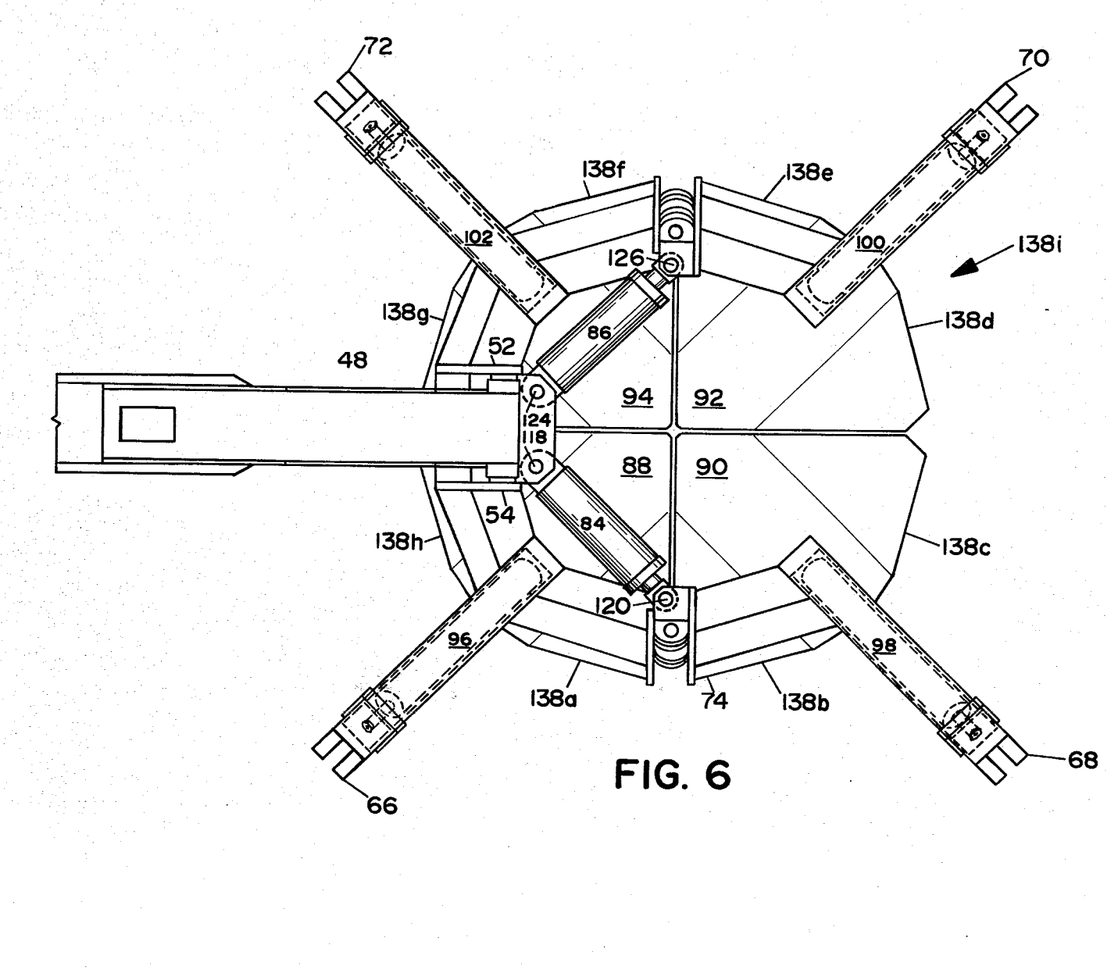
FIG. 6 illustrates a top view of a four-spade digger tower assembly.

With the reference being made to FIG. 1 and, more importantly, to FIG. 6, hydraulic cylinder 84 with self-aligning bushings 118 and 120 and cylinder 86 with self-aligning bushings 124 and 126 provide for the opening and closing of spade tower assemblies 90 and 92. Self-aligning bushings 128 and 130 are provided at the pivot points 58 and 60 for the nose pivot cylinder. The self-aligning bushings 63 and 64 are also provided for the slave cylinder 62 at the pivot points respectfully.

FIG. 2 illustrates an obverse view of the hoist frame structure and hydraulic structure of the tree planter, including the illustrating of the main pivot point 24 with a self-aligning bushing, the hoist main boom elevator cylinder 26 with self-aligning bushings at each end, the swing cylinder 32 with self-aligning bushings at each end, the yaw twist cylinder 38 with self-aligning bushings at each end, the slave cylinder 62 with self-aligning bushings at each end, and the nose pivot cylinder 56 with self-aligning bushings at each end. The opposing tracks 114 and 112 in dashed lines are illustrated as well as the rollers 106, 108b, 110a and 110b; 110a and 110b, 108a and 108b being opposing rollers. All other structure corresponds to that previously described.

Figure 3:
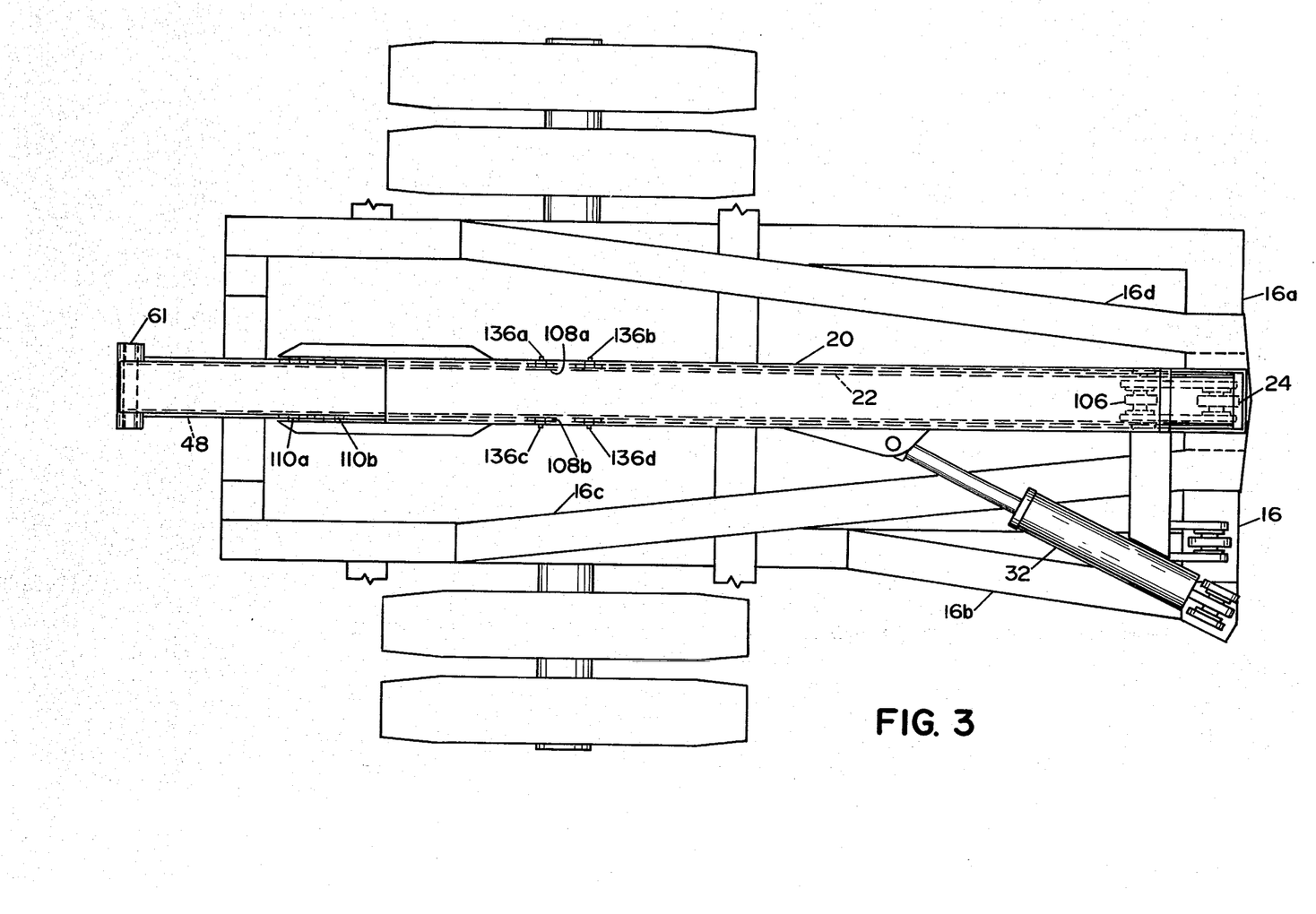
FIG. 3 illustrates a top view of FIG. 2.

FIG. 3 illustrates a top view of the tree planter 10 of the present invention on the chassis frame 14 and including structure of the hoist frame 16 with all numerals corresponding to those elements previously described. The opposing roller wheels placement is illustrated by support axle bushings 136a-136d. All other numerals correspond to those elements previously described.

Figure 4:
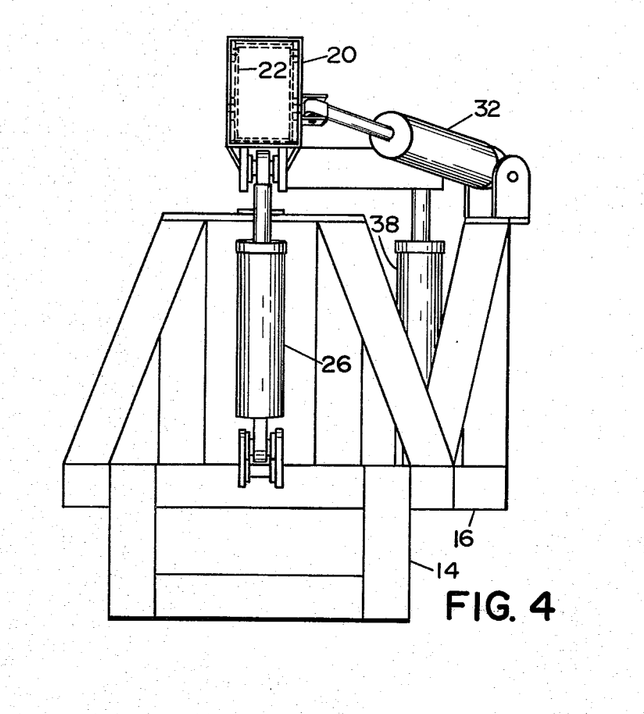
FIG. 4 illustrates a view taken on line 4—4 of FIG. 2.

FIG. 4 illustrates a rear end view of the tree planter 10 on the chassis 14 including a hoist frame 16. Again all numerals correspond to those elements previously described.

Figure 5:
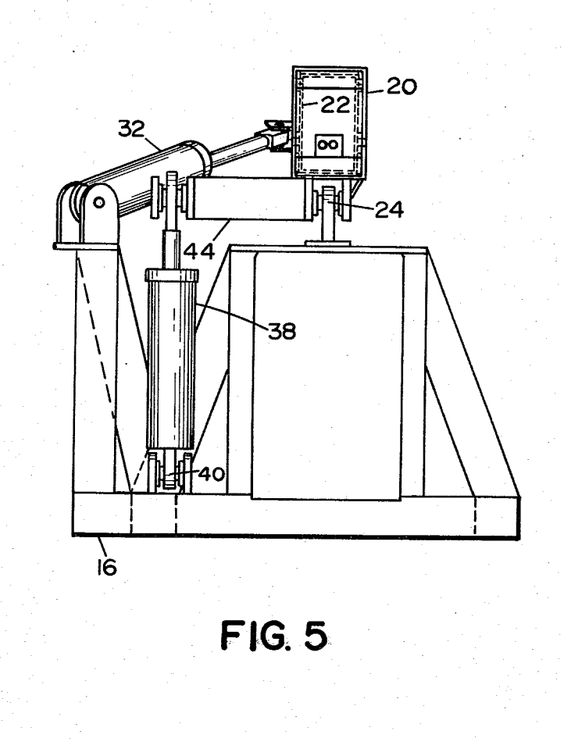
FIG. 5 illustrates a view taken on line 5—5 of FIG. 2.

FIG. 5 illustrates a front end view of the tree planter 10 on the chassis 14 with hoist frame structure 16. Those numerals correspond to those elements previously described.

Particular attention is pointed to the swing cylinder 32 and the yaw twist cylinder 38.

FIG. 6 illustrates a top view of the four-spade digger tower assembly including the eight octagonal sides 138a-138h which provides for the saving of space when working in limited areas such as nurseries and other restricted areas. Other numerals correspond to those elements previously described. The frame 138a supports the sides 138a-138h.

Figure 7:
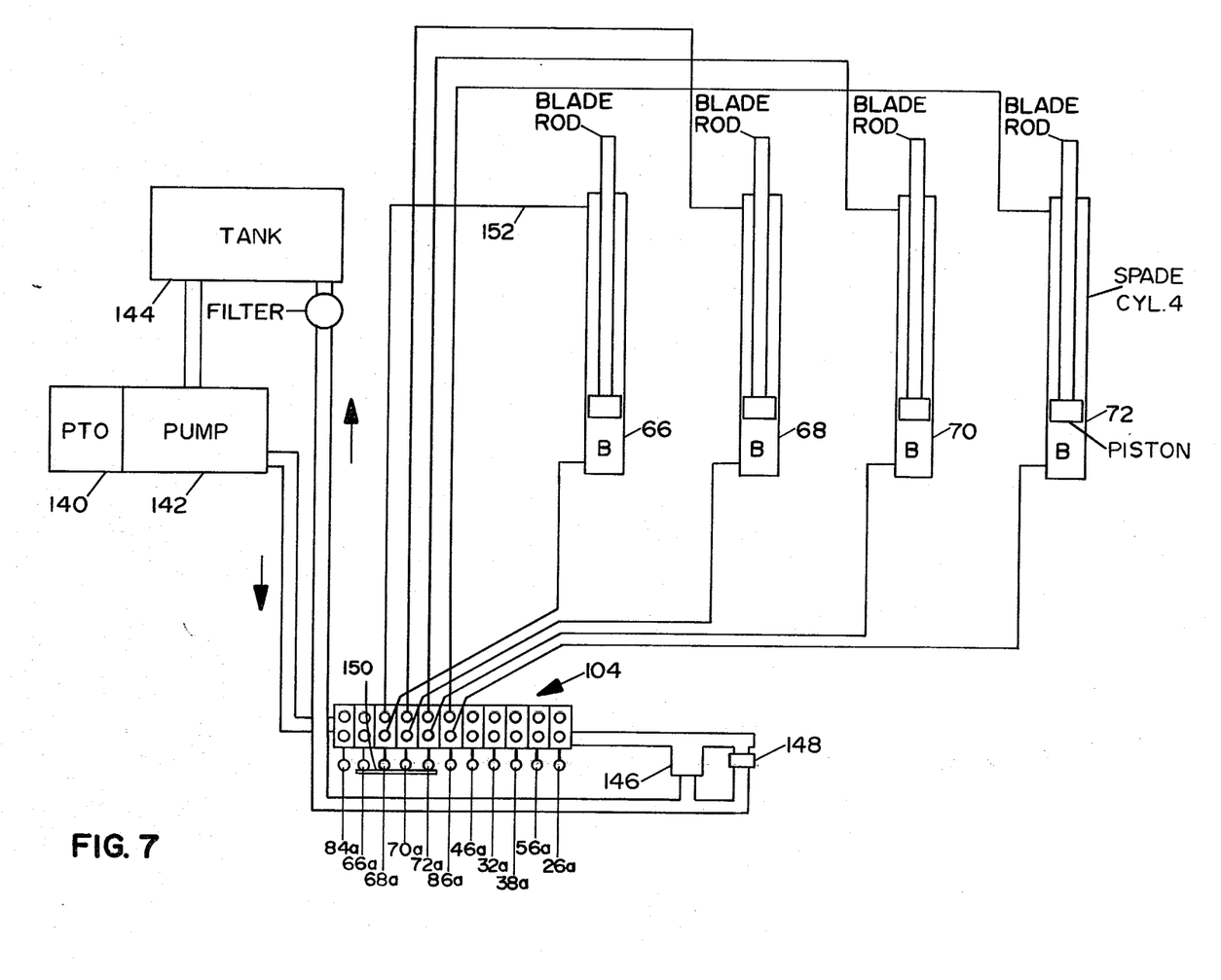
FIG. 7 illustrates a hydraulic system diagram.

FIG. 7 illustrates a hydraulic system diagram of the spade cylinders and the other hydraulic cylinders as required for operation of the system including the power takeoff unit 140, the pump 142, and the tank 144. All cylinders are regulated by the valve-control bank 104.

Tree digger spade tower assembly 50 includes four hydraulic actuated spade towers 66, 68, 70 and 72 arranged in an octagonal frame 74 as illustrated in FIG. 6 and as later described. Hinges 76 and 78 provide for opening and closing of gates 80 and 82 actuated by hydraulic cylinders 84 and 86. Spades 88, 90, 92 and 94 are actuated by hydraulic cylinders 96, 98, 100 and 102 as illustrated in FIG. 6.

Hydraulic cylinder valve control bank 104 regulates each hydraulic cylinder separately where each valve number with an "a" corresponds to the number of that hydraulic cylinder.

The inner boom 22 extends and telescopes on roller assemblies 106, 108 and 110 against outer boom 20.

MODE OF OPERATION

Figure 8:
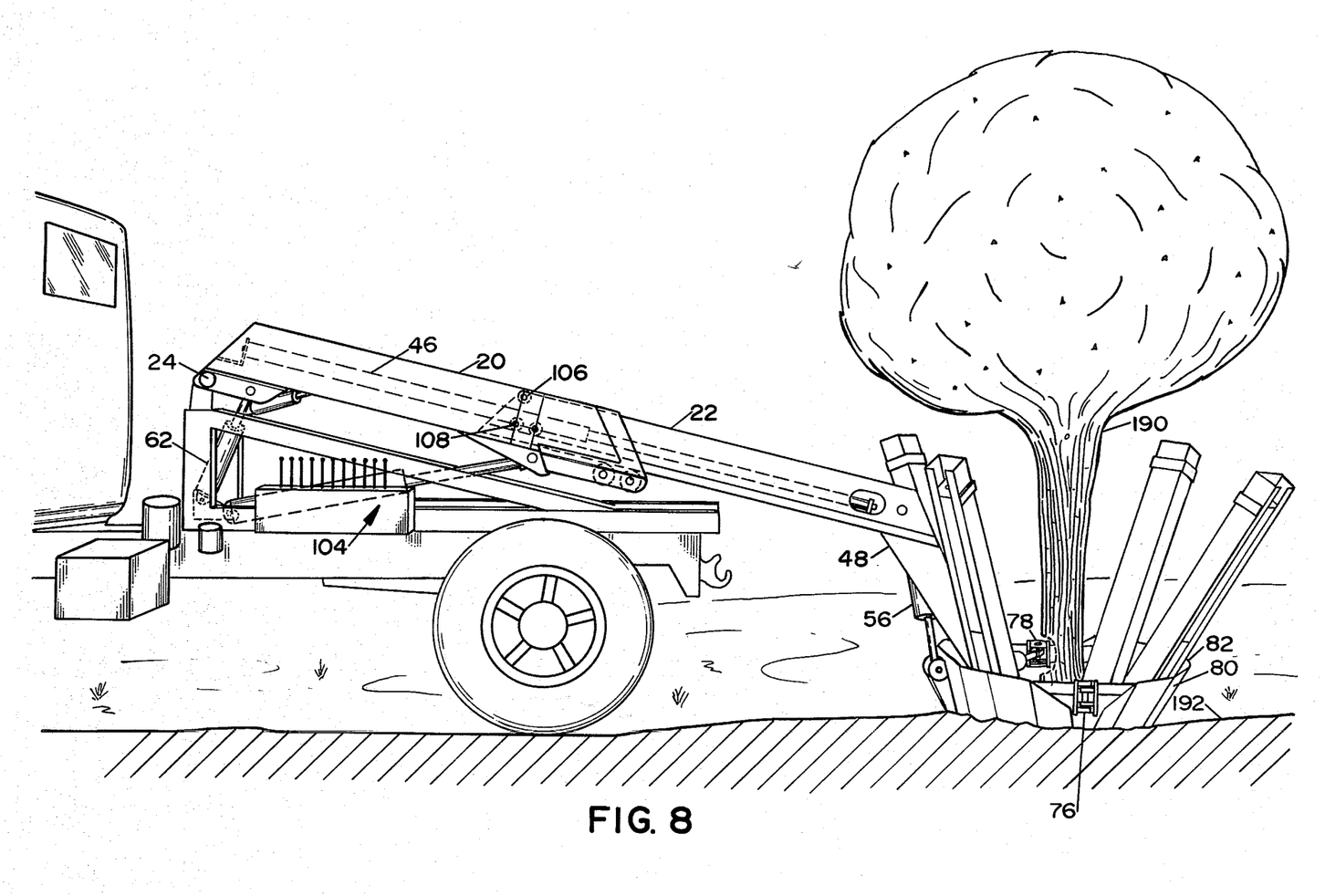
FIG. 8 illustrates planting of a mature tree by the tree planter.

FIG. 8 illustrates the operation of the tree planter in planting a mature tree 200 into the ground 202. The boom is illustrated in extended position where inner cylinder is extended with an outer cylinder 20 during planting of a mature tree 190 into the ground 192. The cylinders are all controlled from the control bank 104 for movement of the boom in all degrees of axial and radial freedom and for controlling of the spades.

The particular orientation of the rollers 106, 108a, 108b, and 110a and 110b is pointed out.

It is noted that with this particular design of tree planter, the tree planter is able to accommodate large cone trailers, such as the TTC-60 four-cone trailer for carrying up to six-inch diameter trees and for removing and depositing trees in the continuous truncated cones. The planter also works with the TTC-45 ten-cone trailer, both cone trailers made by Trans-Tree Corporation of Edina, Minn., the assignee of this patent. The tree spade module tree planter is unique in being able to accommodate the large mature trees where the boom travel can range up to sixty inches. The hydraulic action provides for a 60° tilt forward, a 70° tilt backward, for carrying an extra tree, and 10° side tilt left or right to a vertical digging and transplanting on sloped terrain where the hydraulic spade towers retract inward to prevent damage to other trees during digging operations. All hydraulic controls are located at the one station 104 providing full operating control and visibility of work in progress.

The hydraulic operation and parallelogram action provides articulation for facilitating work operations in close quarters at nurseries, tree farms, and points of delivery.

The smaller spade differs from the larger one in that the tree size accommodated for the smaller planters is up to a 4½" diameter trunk for evergreens, a soil cone diameter of 43" and a soil cone depth of 42". The larger tree planter will accommodate up to a 6" diameter trunk with a 52" cone depth and a 60" cone diameter.

The slave cylinder 62 and nose cylinder 56 connect in through a parallel hydraulic parallelogram circuit through the forward and aft tilt valve providing for the parallel action of the nose with respect to the ground.

A quick blade return can also be provided including a pressure-relief valve 146 and a two-way shutoff valve 148 for the tank return line. When quick return handle is pulled, illustrated in the dotted line 150, all four valve handles are set for directing flow to piston section B as illustrated in the FIG. 7. While it would normally enter B and be forced by piston out via way of the line 152 back to the valve tank 144 to provide the return section to the tank; however, the tank line is now blocked by the valve 148. Valve pressure is therefore forced to both sides of the piston. The piston base end is larger than the rod and the piston with the rod is rapidly moved toward the rod end. In effect, the return has become a regenerative circuit. The tank side of the hydraulic valve is not designed to withstand system working pressure so the system relief valve 146 protects the control valve from overload.

FIRST ALTERNATIVE EMBODIMENT

Figure 9:
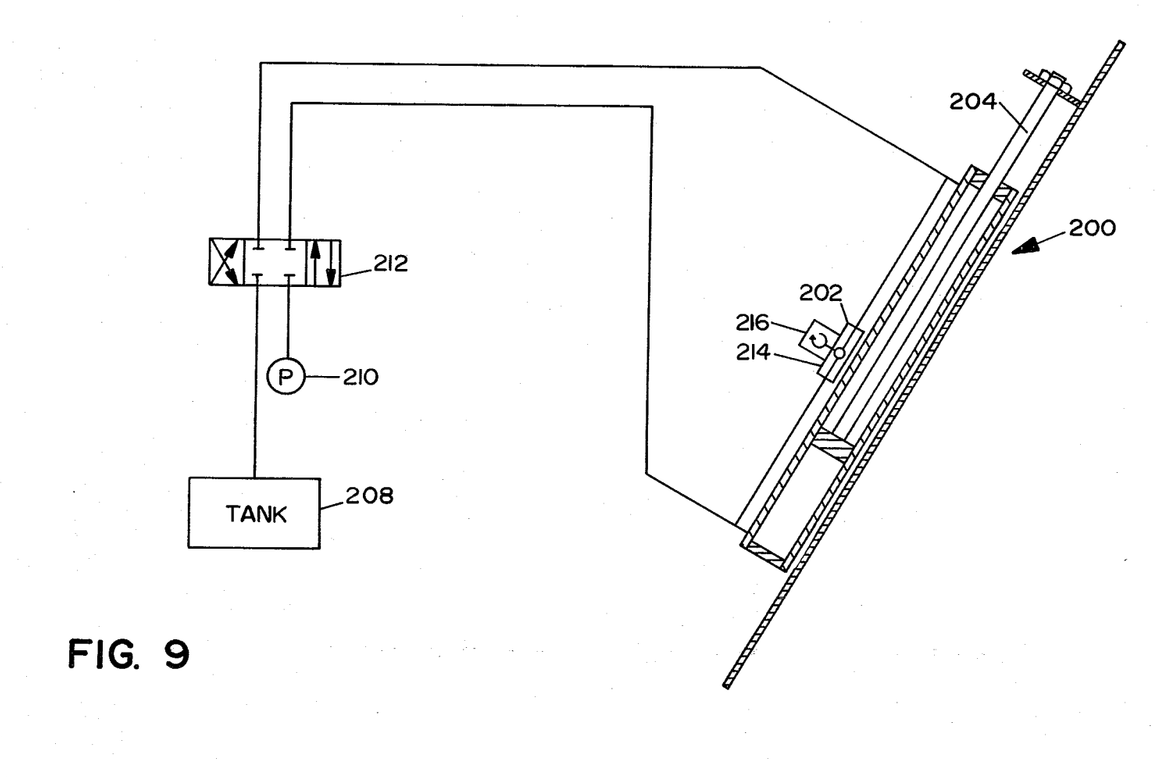
FIG. 9 illustrates a vibrator assembly for each spade tower.

FIG. 9 illustrates a schematic diagram of a vibrating spade assembly 200 including pulsating electric valve 202 for a spade hydraulic cylinder 204 connected to a spade 206. The hydraulic circuit includes a hydraulic tank 208, a hydraulic pump 210 and hydraulic valve 212. The pulsator 202 can include a ball valve 214 rotated by an electric gear motor 216. This will continuously open and close flow of hydraulic fluid under pressure from the tank line and therefore impose a pulsating force in a jack hammer type of action on the spade when needed as actuated.

In the alternative, the pulsator or vibrator circuit can include an electric control valve actuated by a suitable electrical or electromechanical circuit such as a automotive blinker switch whose time constant is controlled by a variable potentiometer. The circuit would electrically control the opening of the valve in addition to varying the frequency of vibration.

SECOND ALTERNATIVE EMBODIMENT

Dual hydraulic cylinder spade tower assembly

Figure 10:
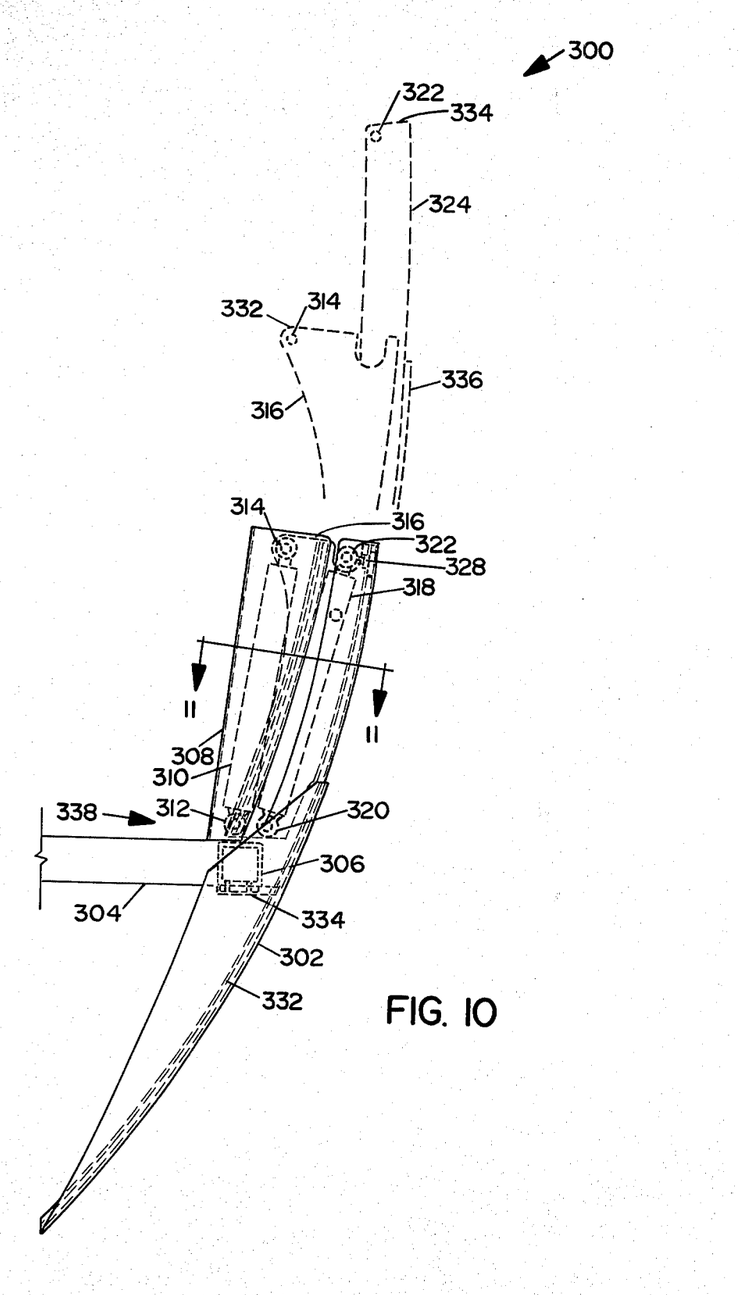
FIG. 10 illustrates a side view of a dual cylinder hydraulic spade tower.
Figure 11:
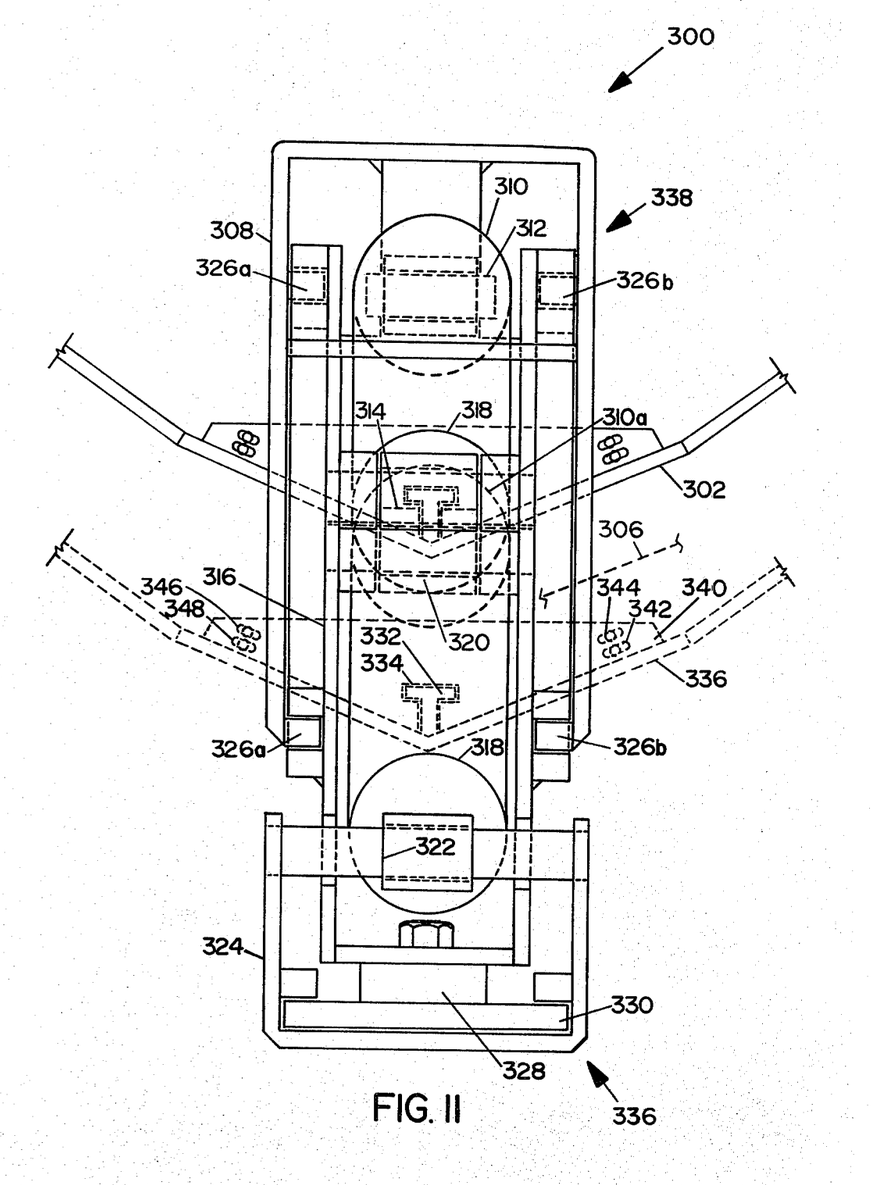
FIG. 11 illustrates a sectional view taken along line 11—11 of FIG. 9.

FIG. 10 illustrates a partial view of a dual hydraulic cylinder spade tower assembly 300 including a tree planter spade 302 supported on a spade tower assembly as now described. A spade frame 304 includes an octagonal spade frame channel having member 306 from a side view, with a main support channel 308 welded and affixed thereto in a substantially vertical configuration extending upward and having a U-shaped cross section as also illustrated in FIG. 11. An hydraulic cylinder 310 affixes between pivot points 312 at the channel member 306 and 314 of a first inner channel 316 having an I beam configuration. The pivot point 314 is locatably secured at the top position of the inner channel 316. A second hydraulic cylinder 318 connects between a pivot point 320 in a lower portion of the first inner channel 316 to a second outer channel 324 at a pivot point and an upper portion of the outer channel 322. The second outer channel has a U-shaped configuration which is larger in cross section than the inner channel 316. The inner channel 316 travels on a railway of two opposing members 326A and 326B in a substantially planer position from an excavate-deposit to a spade up level. The second outer channel 324 travels in a bearing 328 330 arrangement with respect to the air channel 316 for raising of the spade to a up level through the dual action of the hydraulic cylinders. FIG. 10 illustrates the channels in a rest mode and also illustrates the channels in an elevated mode where the channel 316 is illustrated in dash lines to point 332 and the channel 324 is illustrated in dash lines to an elevated mode 334 where the spade is also illustrated in dash lines 336 in a up mode.

In operation, with action of the hydraulic system where the channel 324 rises first carrying the spade 302 as being the element of least weight with the inner channel 322 rising second for carrying the structure of the spade et al., although depending upon system pressures, etc., the channels 316 and 324 could rise identically, or in any combination thereof. The gist of the dual action cylinders is that the inner channel 316 rises to a first height and the outer channel 324 carrying the spade 302 rises to a second height. This provides for compactness, consumes least area, and protects surrounding trees. This is also illustrated in FIG. 11 showing the spade in the rest position 302 and the spade 336 in a raised position 336 illustrating that there is minimal differential of distance between a lowered excavating-depositing level and a raised-elevated transport removal level.

FIG. 11 illustrates a sectional view taken along line 11—11 of FIG. 10 where all numerals correspond to those elements previously described. Particularly noted is the channel 326 A and B which oppose each other and are offset with respect to each other as the channel has a slight angular configuration and is so illustrated for the sake of clarity in the drawings. The cylinders 310 and 312 are illustrated as well as the respective four pivot points. The inner channel 316 as well as the outer channel 324 are illustrated with the wheel 330 and bearing 328.

The bottom view of the slide is illustrated as 338 in the FIGS. while the top view of the slide 336 is likewise illustrated. The slides are continuous between the top and bottom views in a substantially vertical plane with a slight angular definition providing for the movement of the spade. The spade 302 includes a T-member 332 which slides in a T-member guide 334 providing for bottom slide support and movement of the spade about the frame 306 and support 308. In FIG. 11, the roller 328-bearing 330 in the top of the mid member 316 provides for upper top support and movement of the spade assembly 302 during upward movement. The T-member and T-slide member with the roller-bearing member 328-330 as well as the interconnection of the hydraulic cylinders 310 and 318 between the members 308 and 316 provide for the overall raising and lowering of the spade assembly 302 in the spade tower. This operation is identical for each to the spade tower assemblies and would be applicable about the frame of the digger frame supporting the spade tower.

The interaction of the channel components through the action of the hydraulic system and the channels of the three members with respect to each other including the fourth interaction of the T-guide for the spade assembly provides for stable raising and lowering of the spade in a confined area of least footage. The mode of operation is applicable to any tree planter or like digging or construction equipment which such dual-multiple raising structure is required in a substantially vertically plane in confined space.

The T-guide positions in a spade plate 340 having four elongated holes in dual opposing symmetrical relationship with each other. The holes are 342, 344, 346, and 348. Bolts secure the spade plate 340 to the frame members 304 and 306 for adjustment of the distance betweeen the blades as required in the event the blades are skewed, etc. The elongated holes 342-348 can also have a slight radius as required for movement of each spade assembly 302 about the frame and about the T-member as required. The spade plate including the elongated holes provides for the lateral adjustment of each spade assembly about the frame over a degree of freedom determined by the circumference of the holes.

Various modifications can be made to the tree planter of the present invention without departing from the apparent scope thereof. For instance, the rollers 108 may not be required and are utilized as an additional bearing surface as well as the associated structure.

Having thus described the invention, what is claimed is:

1. Tree planter comprising: vehicular chassis including a frame, an engine mounted on said frame, at least two axles of wheels axially mounted on said frame, a transmission connected between one of said axles and said engine, a hydraulic take-off power system for providing hydraulic pressure connected to said engine; a hoist frame means affixed to said vehicle frame and supporting a main pivot point, a boom including a telescopically extendable inner and outer boom assembly affixed at said main pivot point through a self-aligning bushing; a main boom hoist cylinder connected between a mid portion of said outer boom and a lower portion of said hoist frame means through self-aligning bushings, a side-swing cylinder connected between a side pivot point of said outer boom and said hoist frame means through self-aligning bushings, a yaw twist cylinder connected through a single bar linkage between said main pivot point and said hoist frame means through self-aligning bushings; said inner boom supporting a nose for a digger means, said inner boom slidable on a plurality of rollers supported at one end of said inner boom, and rollers at an outer end of said outer boom, and a track affixed to said inner boom and riding between opposing rollers affixed to an interior of said outer boom, and a hydraulic cylinder connected between the outer ends of said inner boom and said outer boom for telescopically extending and retracting said boom assembly, a nose pivot cylinder connected between said outer end of said inner boom and said digger means; said digger means pivoted on an end of said nose, said nose pivot cylinder mounted between self-aligning bushings; said digger means including a frame and including four hydraulically actuated spade towers, each of said spade towers supporting a spade actuated by said hydraulic cylinder, two gate pivots at opposing positions, said gate pivots supporting two of said hydraulically actuated spade towers, said gates actuated about said pivots by gate hydraulic cylinders mounted through self-aligning bushings for opening and closing said gate hydraulic spade towers about a mature tree whereby said main boom hoist elevator cylinder, said yaw twist cylinder, and said swing cylinder provide for all degrees of axial and radial freedom of movement of said boom assembly, said hydraulic cylinder connected between said ends of said outer and inner booms provides for telescopically extending and retracting action of said boom assembly carrying said digger means, and an octagonal digger means assembly providing for working in restricted areas and about trees, thereby providing for excavation, transportation and planting of a tree.

2. Tree planter of claim 1 including a slave cylinder connected between said hoist frame means and a lower portion of said outer boom, a hydraulic circuit means connecting said slave cylinder to said nose cylinder whereby said slave cylinder and nose cylinder provide for parallelogram action during articulation of said digger while moving said boom forward and aft thereby providing predetermined reference of said digger means.

3. Tree planter of claim 1 supporting means for pulsating hydraulic fluid to each of said spade hydraulic cylinders whereby said pulsating action continuously opens and closes the flow of hydraulic fluid under pressure from the tank line thereby imposing a pulsating jackhammer type force of action through said spade.

4. Tree planter of claim 1 wherein said pulsating means comprises an electric control valve connected in said hydraulic circuit and means for switching said valve.

5. Tree planter of claim 4 wherein said switching means comprises an electric gear motor.

6. Tree planter of claim 4 wherein said switching means comprises a blinker switch.

7. Tree planter of claim 4 comprising means for varying frequency of said pulsating means during vibration between said said spade blades and the ground.

8. Tree planter of claim 1 wherein said digger frame comprises an octagonal frame.

9. Tree planter of claim 1 comprising means for quick return of each of said spades.

10. Tree planter of claim 9 including means for regenerating said hydraulic fluid in said hydraulic circuit.

11. Tree planter of claim 1 comprising channel means connected between said spade tower and said spade hydraulic cylinder, and an additional hydraulic cylinder connected between said channel means and said spade tower whereby said two hydraulic cylinders raise said spade in said spade tower in a substantially planar axis with least minimal arcuate movement whereby said second hydraulic cylinder provides for spade movement in close and confined areas.

12. Tree planter of claim 11 including T-guide means connected between said spade and said channel means.

13. Tree planter of claim 11 including spade plate means supporting said spade, said spade plate means including T-groove means for riding over said T-guide means, and a plurality of means for adjusting position of said spade plate means on said frame.

14. Tree planter of claim 11 wherein said adjustment means comprises a plurality of elongated holes parallel to an outer circumference of said frame and bolts extending thru said spade plate means to said frame whereby said spade plate means rotates about said bolts by action thru said elongated holes thereby providing for adjustment of said spades with respect to each other.

15. Tree planter comprising:
a. vehicle means including frame means, engine means on said frame means, transmission means connected to said engine means, and a hydraulic power means;
b. boom means connected at one end to said frame means and plurality of hydraulic cylinder means connected between said frame means and said boom means providing for elevation, side swing, and yaw;
c. digger means connected on a nose end of said boom means including a plurality of hydraulically actuated spade tower means, and gate means for opening and closing said digger means about a tree; and,
d. parallelogram means connected between said end of said boom means and said frame means and between said nose means and said digger means whereby said parallelogram means always maintains said digger means in an upright position during movement of the boom thereby providing articulation for facilitating working operations in close quarters.

* * * * *